US010735541B2

(12) United States Patent
Jain et al.

(10) Patent No.: US 10,735,541 B2
(45) Date of Patent: Aug. 4, 2020

(54) DISTRIBUTED INLINE PROXY

(71) Applicant: VMware, Inc., Palo Alto, CA (US)

(72) Inventors: Jayant Jain, Cupertino, CA (US); Rick Lund, Pleasanton, CA (US); Mike Parsa, Santa Cruz, CA (US); Brenden Blanco, Redwood City, CA (US); Anirban Sengupta, Saratoga, CA (US)

(73) Assignee: VMware, Inc., Palo Alto, CA (US)

( * ) Notice: Subject to any disclaimer, the term of this patent is extended or adjusted under 35 U.S.C. 154(b) by 57 days.

(21) Appl. No.: 16/207,031

(22) Filed: Nov. 30, 2018

(65) Prior Publication Data

US 2020/0177691 A1 Jun. 4, 2020

(51) Int. Cl.
*H04L 29/08* (2006.01)
*H04L 29/06* (2006.01)
*G06F 9/455* (2018.01)

(52) U.S. Cl.
CPC .......... *H04L 67/28* (2013.01); *G06F 9/45558* (2013.01); *H04L 67/1002* (2013.01); *H04L 67/143* (2013.01); *H04L 67/42* (2013.01); *G06F 2009/45595* (2013.01)

(58) Field of Classification Search
CPC combination set(s) only.
See application file for complete search history.

(56) References Cited

U.S. PATENT DOCUMENTS

| 9,609,025 | B1 * | 3/2017 | Betzler | H04L 63/20 |
|---|---|---|---|---|
| 10,063,443 | B2 * | 8/2018 | Haraszti | H04L 43/0888 |
| 2009/0183180 | A1 * | 7/2009 | Nelson | G06F 9/45533 719/319 |
| 2013/0125120 | A1 * | 5/2013 | Zhang | H04L 63/0218 718/1 |

OTHER PUBLICATIONS

"CRIU Integration with Docker Experimental" Mar. 2017.
"P.Haul, CRIU Integration with Live Migration" Nov. 2017.
Corbit, "TCP Connection Repair" p. 1-2, May 2012.

* cited by examiner

*Primary Examiner* — Arvin Eskandarnia

(57) ABSTRACT

In some embodiments, a first proxy is instantiated on the first computing device. and receives packets that are intercepted by a hypervisor. The packets are sent between a workload and another device and the proxy includes a first session between the proxy and the another device and a second session between the proxy and the workload. State information is extracted for the packets that are sent in the first session or the second session at the first proxy and the state information is stored. The first computing device migrates the workload to a second computing device. When the workload is migrated to the second computing device, the state information for the workload is migrated to a second proxy that is instantiated on the second computing device. The second proxy then resumes the first session with the another device and the second session with the proxy using the state information.

21 Claims, 5 Drawing Sheets

DISTRIBUTED INLINE PROXY

BACKGROUND

Man-in-the-middle (MITM) proxy solutions may be used to provide security solutions such as deep packet inspection, intrusion prevention systems (IPS), intrusion detection systems (IDS), uniform resource locator (URL) filtering, etc. The proxy may be a transparent proxy that intercepts client requests towards external servers. The proxy may then dynamically modify the packets, generate new packets, sign server certificates, or provide other services. The proxies are typically centralized and placed at the edge of a network. Accordingly, multiple computing devices communicate through the proxy at the edge, which may introduce scaling issues. For example, as the number of computing devices in the network increases, the load on the proxy increases. A company may have to determine how to scale the centralized proxy to be able to handle the traffic from the computing devices on the network.

Also, when virtualized workload-based solutions are used, some workloads may migrate from one host to another host. Using the centralized proxy may cause an issue as the traffic may need to be redirected from the original host to the new host during the migration. For example, the flows from the proxy to the original host need to be changed to the new host. Further, some packets that were in process while the migration occurs may be sent to the original host instead of the new host. These packets may be lost or need to be redirected to the new host.

DETAILED DESCRIPTION

Figure 1:
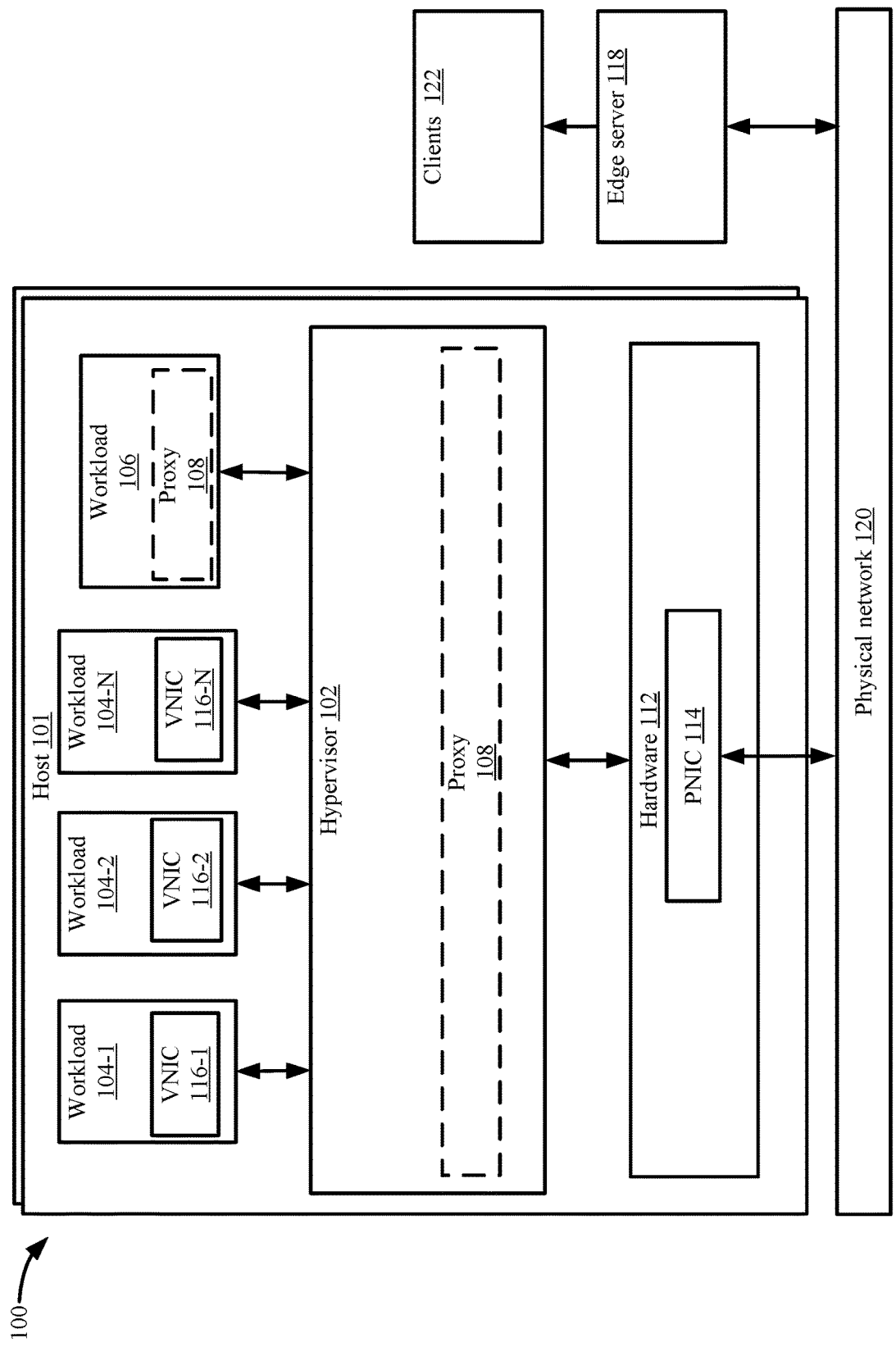
FIG. 1 depicts a simplified system for an inline distributed proxy according to some embodiments.

In the following description, for purposes of explanation, numerous examples and specific details are set forth in order to provide a thorough understanding of embodiments of the present disclosure. Some embodiments as expressed in the claims may include some or all of the features in these examples, alone or in combination with other features described below, and may further include modifications and equivalents of the features and concepts described herein.

Some embodiments use a distributed proxy, which instantiates a proxy, such as a man-in-the-middle (MITM) proxy, on each host in a network. As packets are sent from a client to a server workload running on the host, a hypervisor intercepts the packets and redirects the packets to the proxy. The proxy terminates a first session the client, and extracts state for the first session from the packets. Then, the proxy can start a second session towards the destination, such as a server workload. In other embodiments, as packets are sent from a client workload running on the host, a hypervisor intercepts the packets and redirects the packets to the proxy. The proxy terminates a first session the client workload, and extracts state for the first session from the packets. Then, the proxy can start a second session towards the destination, such as a server. It will be understood the a client workload or server workload may be used.

The proxy may store the extracted state information for each connection. The state information may include information that is needed to maintain the first session and the second session upon a migration of the workload to another host. For example, the state information may include a control block for a transfer control protocol (TCP) session, security information, such as secure socket layer (SSL) keys, and deep-packet inspection (DPI) control information. Because the proxy is terminating the first session with the client and the second session with the server, the proxy can extract this type of state information from the packets.

When the workload is migrated from a first host to a second host, the proxy can retrieve the state information that was stored for the workload. Then, the host migrates the state information with the workload to the second host. The second host can then restore the first session and the second session on a second proxy running on the second host. Using the state information, the second proxy can then resume serving the first session and the second session on the second host. Migrating the state information for the proxy along with the workload transitions the workload to the second host while allowing the second host to restore the active sessions.

Instantiating a proxy on each host for the workloads running on the host and creates a distributed inline proxy at the host. The inline proxy is in the forwarding path for the workload. Unlike the centralized proxy at the edge, the distributed proxy is on the host. Thus, if the workload migrates to from a first host to a second host, the workload's proxy may be on the first host. This would cause the existing sessions for the workload to be terminated or the second host would have to communicate packets from the migrated workload to the first host causing unnecessary traffic on the network. To address this, the proxy terminates the sessions and can extract the state information for the sessions from the packets. Then, the first host can migrate the state for the proxy along with the workload to maintain the inline proxy for the workload on the second host.

Accordingly, by instantiating a proxy per workload, a distributed inline proxy is provided. This provides advantages compared to a proxy situated on the edge server as the distributed inline proxy may be able to scale as load increases. For example, as additional workloads and hosts are added to a network, a proxy situated on the edger server may have to serve the additional workloads and hosts. However, using a distributed inline proxy, the proxies may be instantiated on the new hosts or on the existing hosts as workloads are added. The resources used by the proxies are then distributed on the hosts instead of at a single point at the edge server.

Further, when workloads migrate to other hosts, the proxy state can be migrated to a proxy service running on the new host concurrent with the workload migration. This solves a problem of using a distributed inline proxy because if the proxy state was not migrated, the communications may have had to continue to go back though the original host to the proxy, and then forwarded to the new host that is running the migrated workload. Further, when using an edge proxy, the edge server may not need to be reconfigured for the migrated workload. However, in some embodiments, when the workload is migrated to the new host, the state information for the sessions can be used by the proxy on the new host to maintain the active sessions for the workload without requiring reconfiguration of a centralized proxy at the edge server.

System Overview

FIG. 1 depicts a simplified system 100 for an inline distributed proxy according to some embodiments. System 100 includes hosts 101 that may be connected to a physical network 120. For example, hosts 101 may be part of a data center or other network, which may include any number of hosts (also known as computing devices, host computers, host devices, host systems, physical servers, service systems, etc.) where each host may support any number of workloads 104. Hypervisor 102 is capable of hardware virtualization.

Hosts 101 may include workloads 104-1 to 104-N. Workloads may refer to virtual machines that are running on a respective host, but this is one example of a virtualized computing instance or compute node. Any suitable technology may be used to provide a workload. Workloads may include not only virtual machines, but also containers (e.g., running on top of a host operating system without the need for a hypervisor or separate operating system or implemented as an operating system level virtualization), virtual private servers, client computers, etc. The workloads may also be complete computation environments containing virtual equivalents of the hardware and software components of a physical computing system. Also, as used herein, the term hypervisor may refer generally to a software layer or component that supports the execution of multiple workloads including system-level software that supports name space containers.

Workloads 104-1 to 104-N may send packets through virtual network interface cards (VNIC) 116-1 to 116-N. The packets may be sent through hypervisor 102 to a physical network interface card (PNIC) 114 in hardware 112. Then, packets are routed through physical network 120 to edge server 118, which may be situated at the edge of physical network 120. Edge server 118 may receive packets from hosts 101 and send the packets to an external network. Also, hosts 101 may route packets through physical network 120 to other hosts 101 connected to physical network 120.

A proxy 108 may be instantiated in hypervisor 102 and/or a workload 106. In other embodiments, proxy 108 may be instantiated as a service VM running on host 101. Proxy 108 may be a man-in-the-middle forward proxy that can receive packets from workloads 104 that are running on host 101. In some embodiments, each workload 104-1 to 104-N is associated with a proxy. The proxy may be implemented in different ways. Fore example, instead of running a separate proxy process for each workload 104-1, 104-2, and 104-N, in some examples, proxy 108 may run as a single process on each host 101. Proxy 108 may logically partition a storage space for each workload. Accordingly, each workload 104 may have a separate logical partition of storage space in which to store state information. In this way, proxy 108 may run as a single process, but still operate a logically separate proxy for each workload. In other examples, each workload 104 may be associated with a different process running a separate proxy.

In some embodiments, proxy 108 is a transparent inline proxy where packets from clients 122 arriving via edge server 118 are not addressed to an address of proxy 108. In the transparent inline proxy, each client 122 believes it is communicating with a destination. In some embodiments, the proxy may be a transparent inline proxy. For example, the hypervisor intercepts the packets from client 122 or a load balancer without having the client address the packets to the proxy. However, proxy 108 terminates the connection with client 122 and creates a first session with client 122. Also, packets from workload 104 are intercepted by hypervisor 102 and directed to proxy 108 without having workload 104 address the packets to proxy 108. Proxy 108 creates a second session with workload 104. Additionally, proxy 108 may send the packets in the second session, which does not require the adding the proxy's address to the packets being sent to the client 122. However, both the client 122 and workload believe they are communicating with each other.

Figure 2:
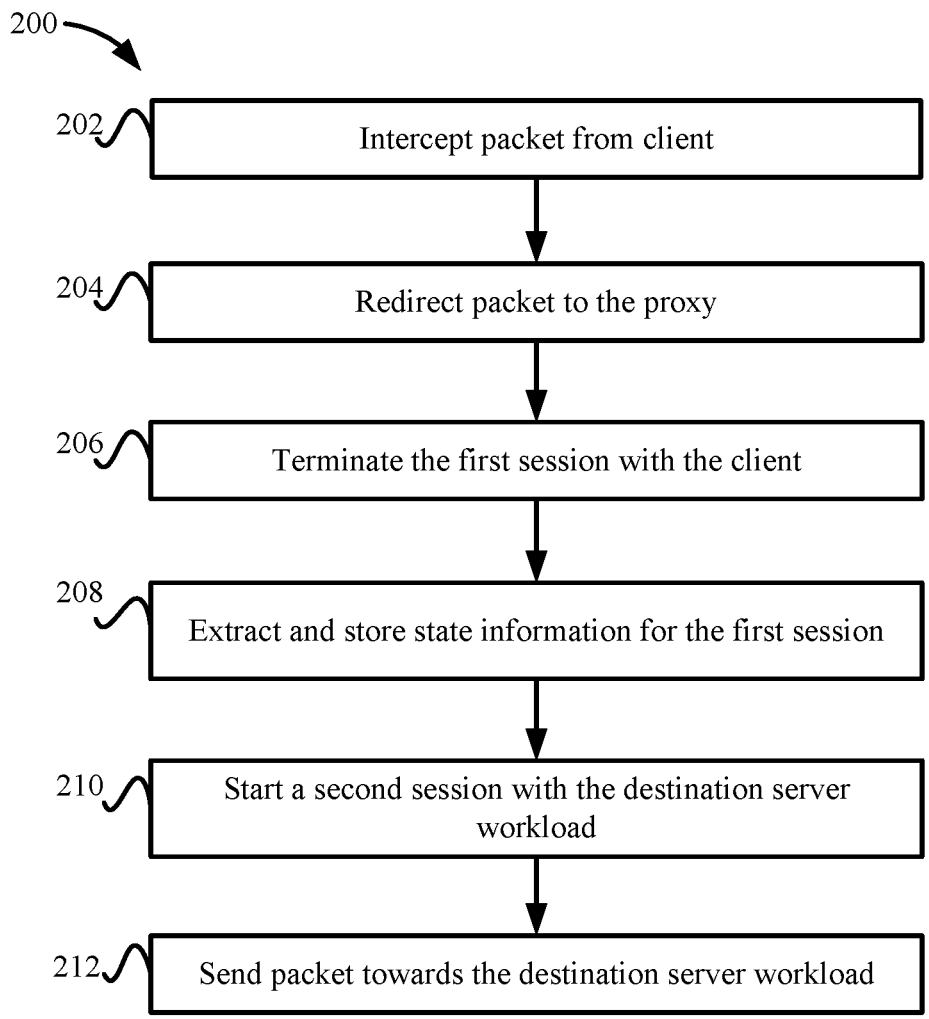
FIG. 2 depicts a simplified flowchart of a method for using a proxy to process packets between workload and a destination according to some embodiments.

FIG. 2 depicts a simplified flowchart 200 of a method for using proxy 108 to process packets between workload 104 and a destination according to some embodiments. At 202, hypervisor 102 intercepts a packet sent from client 122. Hypervisor 102 may be configured via network settings to intercept all packets being sent from client 122. Different methods of intercepting the packets may be appreciated.

At 204, hypervisor 102 redirects the packet to proxy 108. As described above, proxy 108 may be instantiated in hypervisor 102 or in the user space in workload 104. Hypervisor 102 may use different techniques to redirect packets to proxy 108 including encapsulation or by re-writing the IP or media access control (MAC) address for the packet to the proxy's address.

At 206, proxy 108 terminates the first session with client 122. As will be discussed in more detail below, some embodiments migrate workloads 104 from a first host to a second host. Additionally, the state information for the proxy for the workload is migrated where the proxy on the new host can maintain the active sessions. To extract the type of state information to maintain the sessions, proxy 108 may need to terminate the session to retrieve the type of state information needed, such as layer 7 state information. By terminating the first session, proxy 108 may be responsible for responding to the packet, if needed.

At 208, proxy 108 extracts and stores the state information for the first session. Some examples of state information include layer 7 information, such as a control block of a secured communication layer, such as transport layer security (TLS) or secure socket layer (SSL). The control block of the secure communication layer may include context information for the TLS session, cached information for the TLS session, keys, sequence numbers, partial buffers, data stream segments, and flags. Additional state information that may be extracted includes information for the connection, such as the transfer control protocol (TCP) connection. For example, a TCP control block may include sequence numbers for the packets, pending packets, socket interfaces, etc. Also, other state information may be from a deep-packet inspection (DPI), which may be metadata for the streams, such as a hypertext transfer protocol (HTTP) header. Proxy 108 may store the state information for each workload 104 in a data structure. As mentioned above, proxy 108 may store state information for each workload 104 in its own logical space in the data structure.

At 210, proxy 108 starts a second session with the destination workload 104. For example, proxy 108 may extract the server name indication (SNI) in session ID from the packet and start a new session toward the destination server workload. By starting a second session, in addition to forwarding packets from client 122 to the destination server workload 104, proxy 108 may be responsible for responding to packets from the destination server workload 104.

At 212, proxy 108 sends the packet towards the destination server workload. For example, proxy 108 may forward the packet for workload 104 in hypervisor 102 to the destination. By forwarding the packet of workload 104, proxy 108 does not need to insert an address associated with proxy 108 as being the originator of the packet.

The destination server workload receives the packets and can respond to the packets by sending return packets to the address of client 122. Upon receiving the return packets, hypervisor 102 intercepts the packets and redirects the packets to proxy 108. As with packets sent from client 122, proxy 108 may extract any state information from the return packets received from the destination, and store the state information. Also, proxy 108 may then respond to the return packets from the destination, if needed.

Accordingly, when proxy 108 receives the packet from client 122, by terminating the connection, proxy 108 is able to extract state information from the packet that is required for proxy 108 to resume sessions between a client 122 and any destination server workloads. This is different from a passthrough proxy that may only forward the packets and generally be able to inspect the headers of the packet, which may not include enough information to maintain the session upon migration. As discussed above, although a server workload is described, a client workload running on host 101 may communicate with a server located outside of edge server 118.

Proxy Structure

Figure 3:
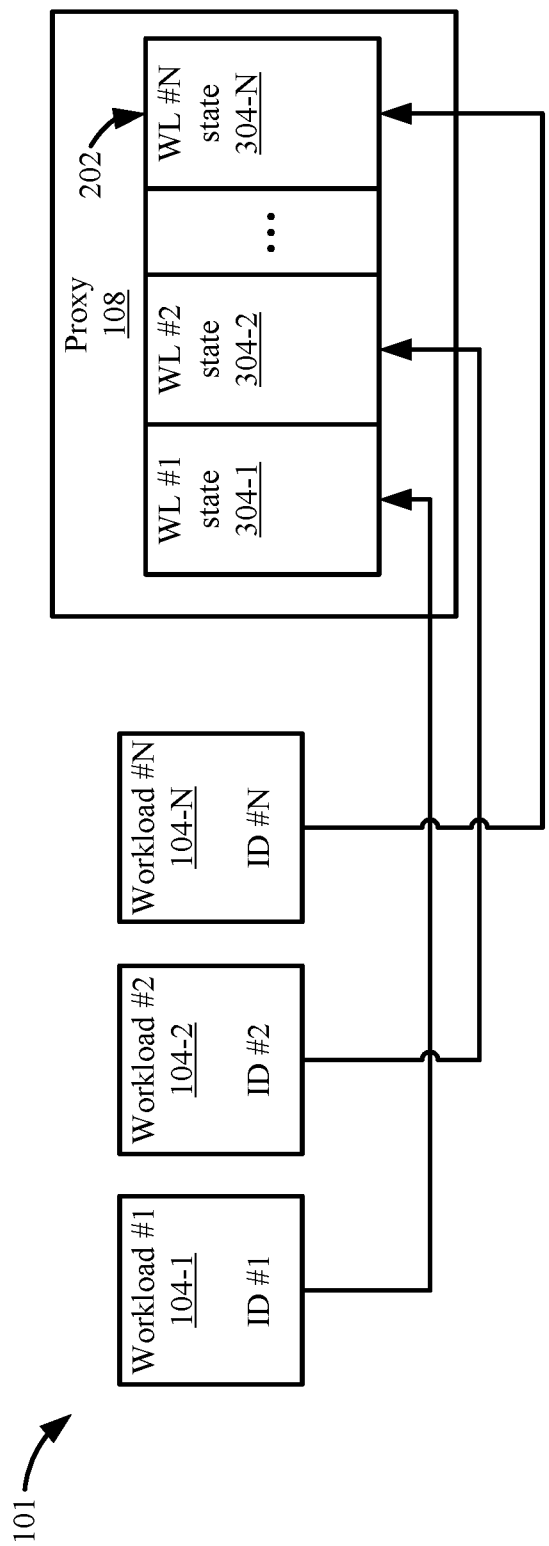
FIG. 3 depicts a more detailed example of the proxy according to some embodiments.

FIG. 3 depicts a more detailed example of proxy 108 according to some embodiments. The example in FIG. 3 shows the scenario where a single instance of proxy 108 is instantiated on host 101 and servicing all workloads. Also, although one process is described, the number of processes running proxies may be scaled on the host. For example, if there are initially 10 workloads, a first process may have an instantiated proxy for the 10 workloads. However, if the number of workloads increases to 20 workloads, then a second instantiation of a second proxy to support the additional ten workloads may be used. Alternatively, the same process may support all 20 workloads and additional processes may be instantiated based on the load (e.g., when a threshold of connections is reached).

In this example, hosts 101 include workloads 104-1 to 104-N (workloads #1 to # N). These workloads may be identified by identifiers, such as an identifier (ID) #1, ID #2 and ID # N, respectively, for workloads #1 to # N. The identifiers may be information that may uniquely identify a workload on host 101, such as a VNIC ID; however, other information may be used to identify workloads.

Proxy 108 may include a data structure 202, which may be partitioned logically for each workload running on host 101. For example, different slices of data structure 202 may be reserved for different workloads and may be accessed using identifiers associated with each workload. In some examples, the IDs may be used as keys to slices of data structure 202, but other methods of identifying slices of data structure 202 may be used.

As shown, proxy 108 may use an ID #1 to access a workload #1 state 304-1, an ID #2 to access a workload #2 state 304-2, and an ID # N to access a workload # N state 304-N. When proxy 108 receives a packet, proxy 108 can retrieve the identifier from the packet, such as the VNIC ID, and store state in data structure 202 in a slice that is associated with the ID.

Workload Migration

Figure 4:
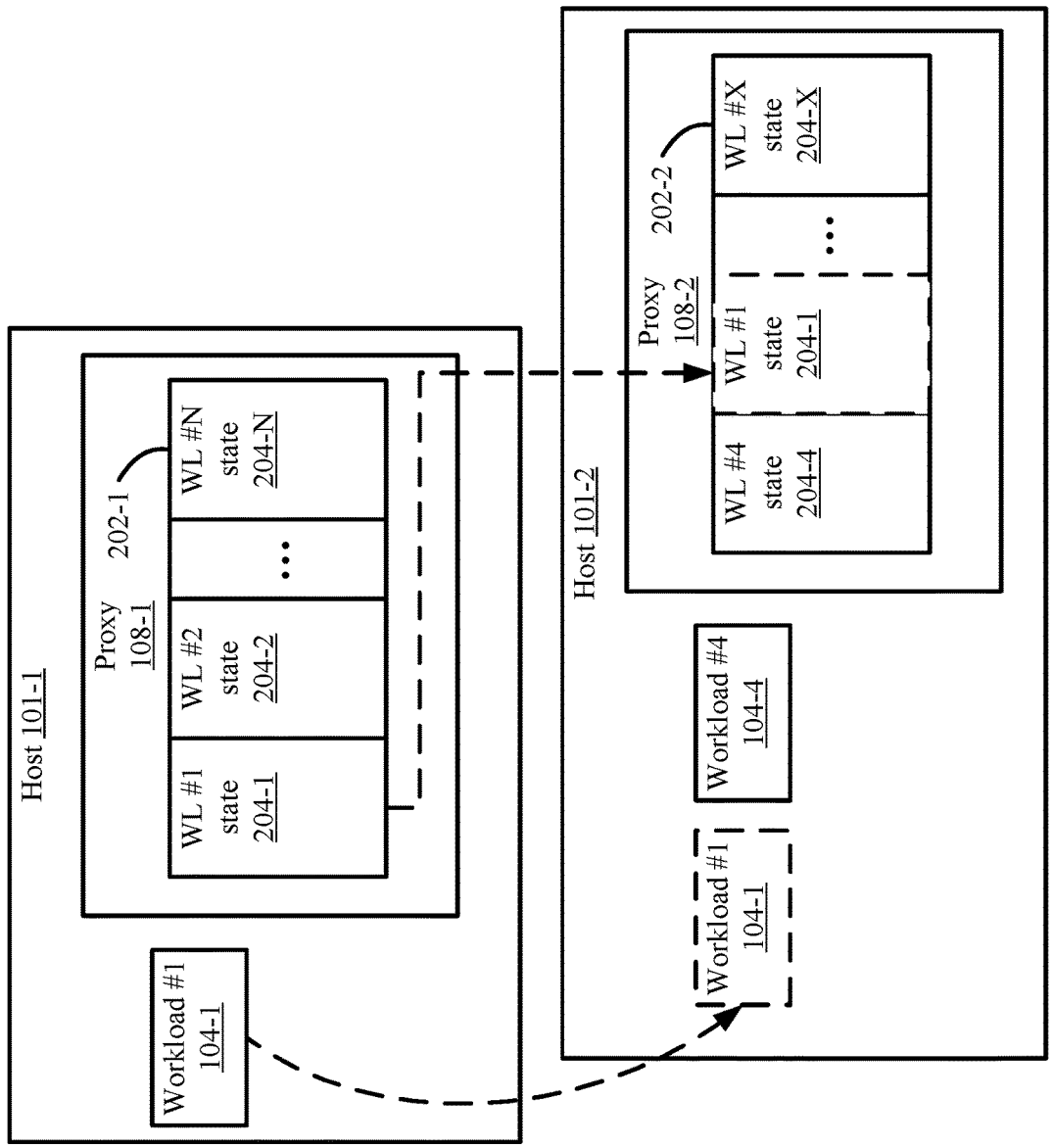
FIG. 4 depicts an example of a migration of a workload according to some embodiments.

Workload #1 104-1 may migrate from one host 101 to another host. FIG. 4 depicts an example of a migration of a workload 104 according to some embodiments. In FIG. 4, a workload #1 104-1 is migrated from host 101-1 to host 101-2. In some examples, host 101-1 and host 101-2 are in the same data center connected to physical network 120. Host 101-1 may be executing its own workloads and host 101-2 is executing its own workloads. In other embodiments, the hosts may reside on different networks or in different data centers in different geographic regions. Also, each host 101 may also be running its own proxy 108.

Proxy 108-1 in host 101-1 may include a data structure 202-1 that includes a workload #1 state 204-1. This may be session state information established for sessions from client 122 to proxy 108 and from proxy 108 to workload 104. In some examples, the state information may be extracted when the migration occurs and may reside in the network stack before the migration. However, the migrated information may be stored in data structure 202-2 in host 101-2.

When the migration occurs, host 101-1 may migrate workload #1 104-1 in addition to workload #1 state 204-1 to host 101-2. Proxy 108-2 stores the migrated state for workload #1 in data structure 202-2. For example, proxy 108-2 uses an ID #1 to identify workload #1 state 204-1 in data structure 202-2. Proxy 108-2 in host 101-2 may also include a data structure 202-2 that stores state for workloads executing on host 101-2. For example, a workload #4 state 202-4 corresponds to a workload #4 104-4 running on host 101-2.

Figure 5:
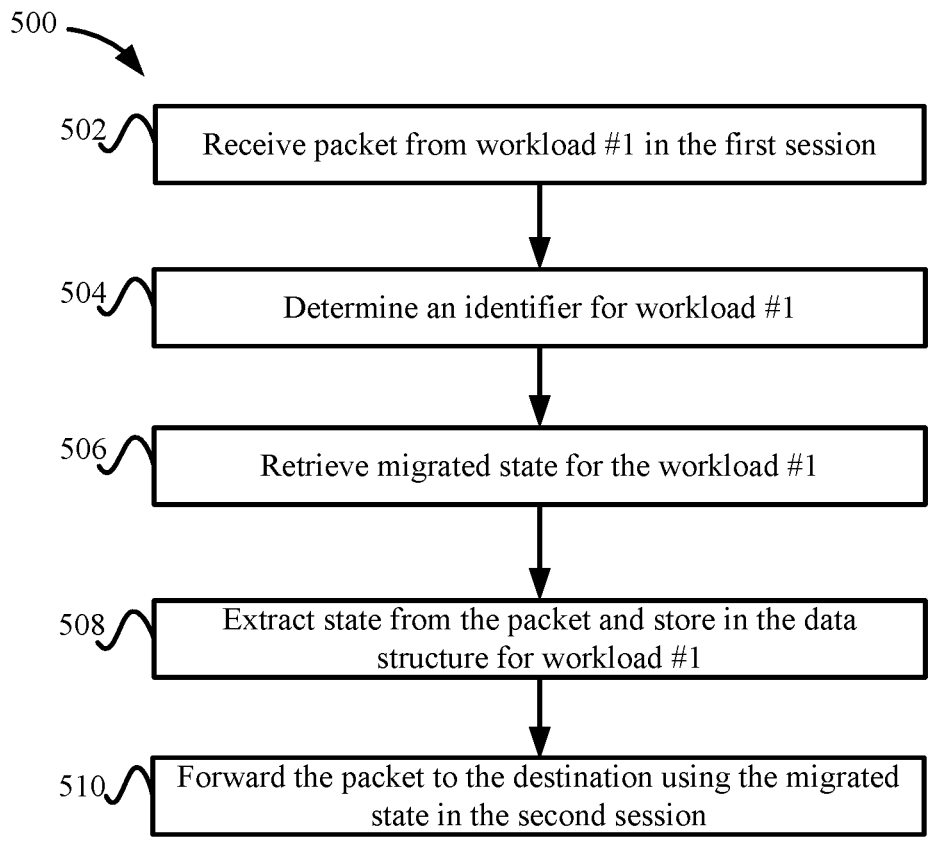
FIG. 5 depicts a simplified flowchart of a method for processing packets for workload #1 according to some embodiments.

Once the state has been migrated, proxy 108-2 can process packets for workload #1. FIG. 5 depicts a simplified flowchart 500 of a method for processing packets for workload #1 according to some embodiments. At 502, proxy 108-2 receives a packet from workload #1. The packet may be intercepted by a hypervisor in host 101-2 and redirected to workload #1. Proxy 108-2 then determines an identifier for workload #1. For example, proxy 108-2 may determine the identifier from the packet.

At 506, proxy 108-2 then retrieves the migrated state for workload #1 in data structure 202-2. For example, workload #1 state 204-1 may have been stored in a slice of data structure 202-2 and is identified by the workload #1 identifier. The migrated state stored in data structure 202-2 includes information needed to continue the first session with workload #1. For example, the migrated state may include information from the TCP stack for the TCP connection of the first session. Proxy 108-2 uses the information from the TCP stack to restart the first session on second host 101-2 and also the second session with the destination. Also, once the first session and the second session are restarted, at 510, proxy 108-2 forwards the packet to destination using the migrated state. The packet is forwarded in the second session that was established on host 101-1. Additionally, proxy 108-2 could receive packets from the destination and forward the packets to workload #1 in the first session.

CONCLUSION

Accordingly, some embodiments provide a distributed inline proxy that includes proxies on each host. To account for the possible migration of workloads, some embodiments store state needed to pause and restart sessions for workloads. The state is then migrated along with the workloads to allow a new proxy to restart the paused sessions on the new host.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure(s). In general, structures and functionality presented as separate components in exemplary configurations may be implemented as a combined structure or component. Similarly, structures and functionality presented as a single component may be implemented as separate components.

Some embodiments described herein can employ various computer-implemented operations involving data stored in computer systems. For example, these operations can require physical manipulation of physical quantities—usually, though not necessarily, these quantities take the form of electrical or magnetic signals, where they (or representations of them) are capable of being stored, transferred, combined, compared, or otherwise manipulated. Such manipulations are often referred to in terms such as producing, identifying, determining, comparing, etc. Any operations described herein that form part of one or more embodiments can be useful machine operations.

Further, one or more embodiments can relate to a device or an apparatus for performing the foregoing operations. The apparatus can be specially constructed for specific required purposes, or it can be a general purpose computer system selectively activated or configured by program code stored in the computer system. In particular, various general purpose machines may be used with computer programs written in accordance with the teachings herein, or it may be more convenient to construct a more specialized apparatus to perform the required operations. The various embodiments described herein can be practiced with other computer system configurations including handheld devices, microprocessor systems, microprocessor-based or programmable consumer electronics, minicomputers, mainframe computers, and the like.

Yet further, one or more embodiments can be implemented as one or more computer programs or as one or more computer program modules embodied in one or more non-transitory computer readable storage media. The term non-transitory computer readable storage medium refers to any data storage device that can store data which can thereafter be input to a computer system. The non-transitory computer readable media may be based on any existing or subsequently developed technology for embodying computer programs in a manner that enables them to be read by a computer system. Examples of non-transitory computer readable media include a hard drive, network attached storage (NAS), read-only memory, random-access memory, flash-based nonvolatile memory (e.g., a flash memory card or a solid state disk), a CD (Compact Disc) (e.g., CD-ROM, CD-R, CD-RW, etc.), a DVD (Digital Versatile Disc), a magnetic tape, and other optical and non-optical data storage devices. The non-transitory computer readable media can also be distributed over a network coupled computer system so that the computer readable code is stored and executed in a distributed fashion.

Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations can be implemented as a combined structure or component. Similarly, structures and functionality presented as a single component can be implemented as separate components.

These and other variations, modifications, additions, and improvements may fall within the scope of the appended claims(s). As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments of the present disclosure along with examples of how aspects of the present disclosure may be implemented. The above examples and embodiments should not be deemed to be the only embodiments, and are presented to illustrate the flexibility and advantages of the present disclosure as defined by the following claims. Based on the above disclosure and the following claims, other arrangements, embodiments, implementations and equivalents may be employed without departing from the scope of the disclosure as defined by the claims.

What is claimed is:

1. A method comprising:
instantiating, by a first computing device, a first proxy on the first computing device, the first proxy configured to receive one or more packets that are intercepted by a hypervisor, wherein the one or more packets are sent between a workload and another device and the proxy includes a first session between the proxy and the another device and a second session between the proxy and the workload;
extracting, by the first computing device, state information for the one or more packets that are sent in the first session or the second session at the first proxy;
storing, by the first computing device, the state information for the workload;
migrating, by the first computing device, the workload to a second computing device; and
when the workload is migrated to the second computing device, migrating, by the first computing device, the state information for the workload to a second proxy that is instantiated on the second computing device, wherein the second proxy resumes the first session with the another device and the second session with the workload using the state information.

2. The method of claim 1, wherein the first proxy is included in another workload running on the first computing device or in the hypervisor.

3. The method of claim 1, wherein the first proxy stores a plurality of state information for a plurality of workloads running on the first computing device.

4. The method of claim 3, wherein storing the state information for the workload comprises:
determining an identifier for the workload; and
storing the state information for the workload in a portion of a data structure associated with the identifier, wherein the data structure stores the plurality of state information for the plurality of workloads.

5. The method of claim 3, wherein migrating the state information for the workload comprises:
determining an identifier for the workload; and
extracting the state information for the workload in a portion of the data structure associated with the identifier.

6. The method of claim 1, wherein each workload running on the first computing device is associated with an instantiation of the first proxy.

7. The method of claim 1, wherein:
the second proxy is associated with a data structure that stores state information for workloads running on the second computing device, and
the second proxy stores the migrated state information in the data structure for the first workload.

8. A non-transitory computer-readable storage medium containing instructions, that when executed, control a first computing device to be configured for:
instantiating a first proxy on the first computing device, the first proxy configured to receive one or more packets that are intercepted by a hypervisor, wherein the one or more packets are sent between a workload and another device and the proxy includes a first session between the proxy and the another device and a second session between the proxy and the workload;
extracting state information for the one or more packets that are sent in the first session or the second session at the first proxy;
storing the state information for the workload;
migrating, by the first computing device, the workload to a second computing device; and
when the workload is migrated to the second computing device, migrating the state information for the workload to a second proxy that is instantiated on the second computing device, wherein the second proxy resumes the first session with the another device and the second session with the workload using the state information.

9. The non-transitory computer-readable storage medium of claim 8, wherein the first proxy is included in another workload running on the first computing device or in the hypervisor.

10. The non-transitory computer-readable storage medium of claim 8, wherein the first proxy stores a plurality of state information for a plurality of workloads running on the first computing device.

11. The non-transitory computer-readable storage medium of claim 10, wherein storing the state information for the workload comprises:
determining an identifier for the workload; and
storing the state information for the workload in a portion of a data structure associated with the identifier, wherein the data structure stores the plurality of state information for the plurality of workloads.

12. The non-transitory computer-readable storage medium of claim 10, wherein migrating the state information for the workload comprises:
determining an identifier for the workload; and
extracting the state information for the workload in a portion of the data structure associated with the identifier.

13. The non-transitory computer-readable storage medium of claim 8, wherein each workload running on the first computing device is associated with an instantiation of the first proxy.

14. The non-transitory computer-readable storage medium of claim 8, wherein:
the second proxy is associated with a data structure that stores state information for workloads running on the second computing device, and
the second proxy stores the migrated state information in the data structure for the first workload.

15. A first computing device comprising:
one or more computer processors; and
a non-transitory computer-readable storage medium comprising instructions, that when executed, control the one or more computer processors to be configured for:
instantiating a first proxy on the first computing device, the first proxy configured to receive one or more packets that are intercepted by a hypervisor, wherein the one or more packets are sent between a workload and another device and the proxy includes a first session between the proxy and the another device and a second session between the proxy and the workload;
extracting state information for the one or more packets that are sent in the first session or the second session at the first proxy;
storing the state information for the workload;
migrating, by the first computing device, the workload to a second computing device; and
when the workload is migrated to the second computing device, migrating the state information for the workload to a second proxy that is instantiated on the second computing device, wherein the second proxy resumes the first session with the another device and the second session with the workload using the state information.

16. The first computing device of claim 15, wherein the first proxy is included in another workload running on the first computing device or in the hypervisor.

17. The first computing device of claim 15, wherein the first proxy stores a plurality of state information for a plurality of workloads running on the first computing device.

18. The first computing device of claim 17, wherein storing the state information for the workload comprises:
determining an identifier for the workload; and
storing the state information for the workload in a portion of a data structure associated with the identifier, wherein the data structure stores the plurality of state information for the plurality of workloads.

19. The first computing device of claim 17, wherein migrating the state information for the workload comprises:
determining an identifier for the workload; and
extracting the state information for the workload in a portion of the data structure associated with the identifier.

20. The first computing device of claim 15, wherein each workload running on the first computing device is associated with an instantiation of the first proxy.

21. The first computing device of claim 15, wherein:
the second proxy is associated with a data structure that stores state information for workloads running on the second computing device, and
the second proxy stores the migrated state information in the data structure for the first workload.

* * * * *